Nov. 27, 1962 R. O. CHAMBERS ETAL 3,065,810
AUXILIARY PUMP AND CONTROLS FOR VEHICLES
WITH HYDRAULIC TRANSMISSIONS
Filed Dec. 18, 1959 3 Sheets-Sheet 1
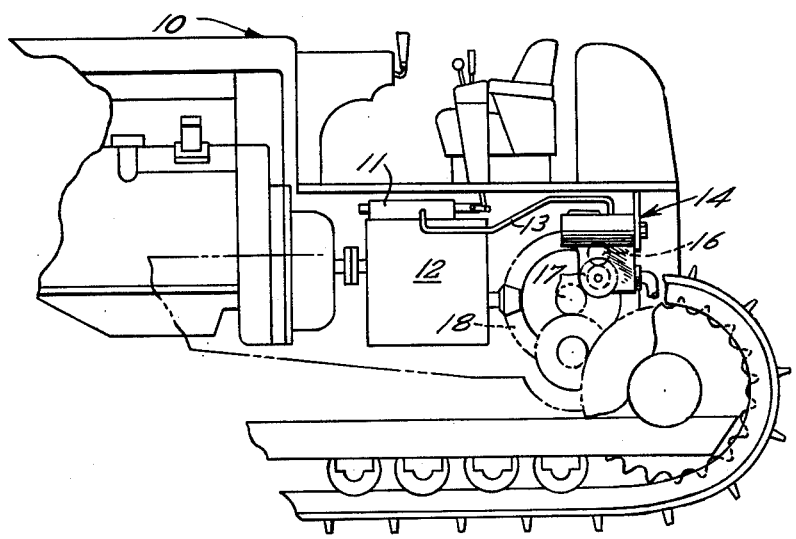
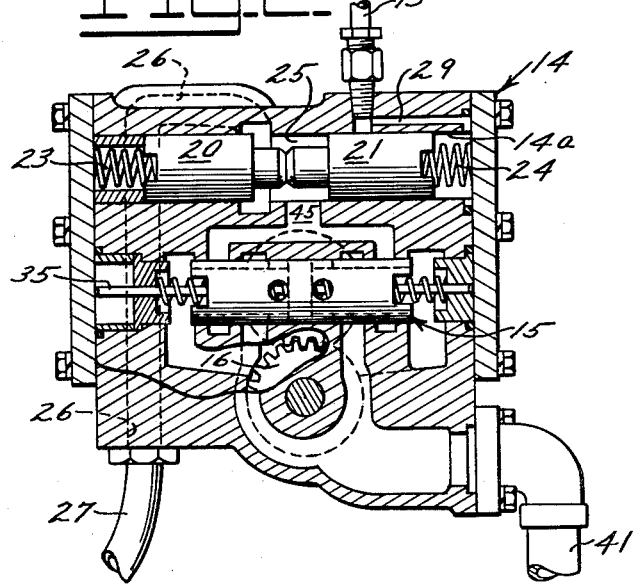
INVENTORS
ROBERT O. CHAMBERS
CHARLES A. RAMSEL
BY
*Fryer and Johnson*
ATTORNEYS Nov. 27, 1962   R. O. CHAMBERS ETAL   3,065,810
AUXILIARY PUMP AND CONTROLS FOR VEHICLES
WITH HYDRAULIC TRANSMISSIONS
Filed Dec. 18, 1959   3 Sheets-Sheet 2
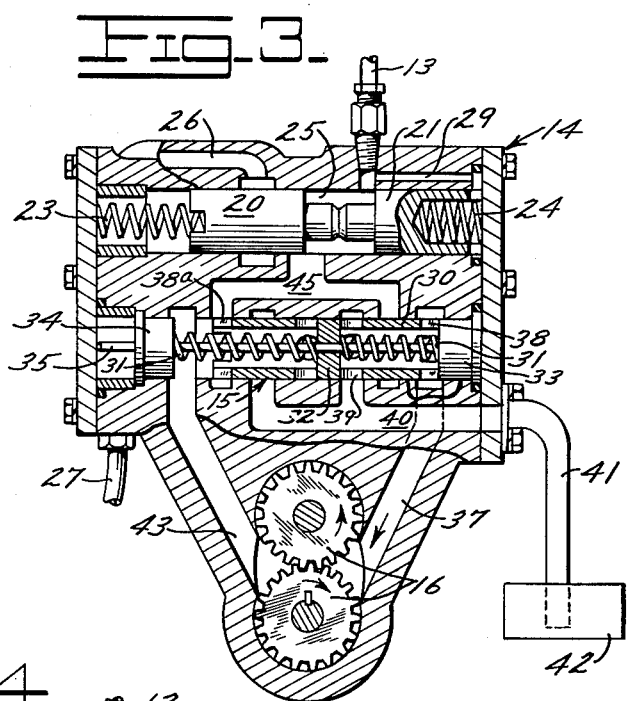
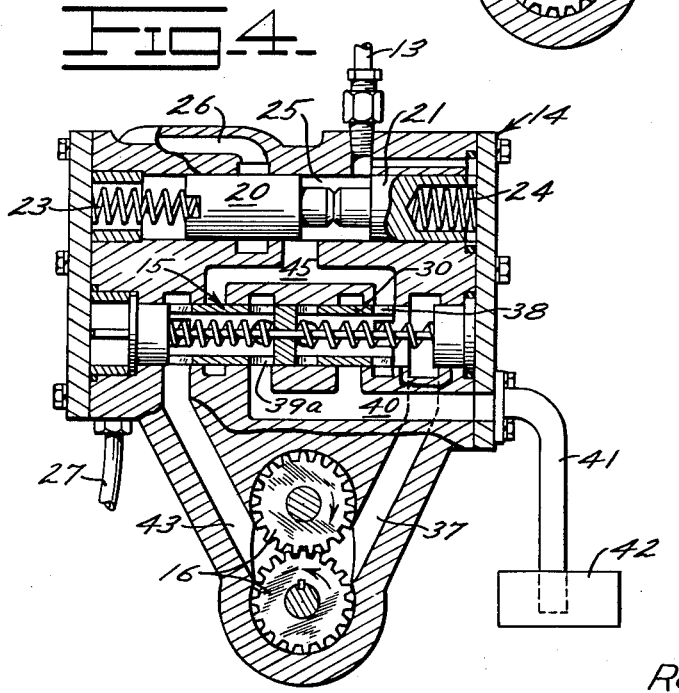
INVENTORS
ROBERT O. CHAMBERS
CHARLES A. RAMSEL
BY
Fryer and Johnson
ATTORNEYS

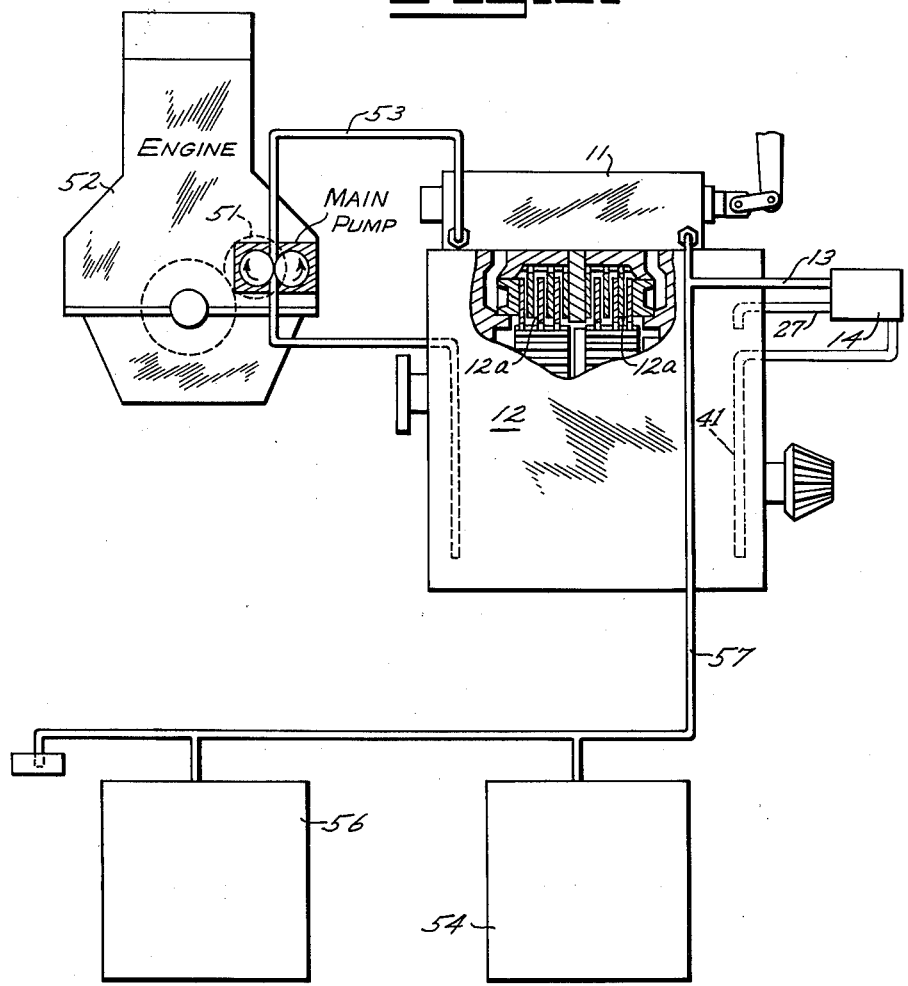

United States Patent Office 3,065,810
Patented Nov. 27, 1962

3,065,810
AUXILIARY PUMP AND CONTROLS FOR VEHICLES WITH HYDRAULIC TRANSMISSIONS
Robert O. Chambers, Elmwood, and Charles A. Ramsel, Peoria, Ill., assignors to Caterpillar Tractor Co., Peoria, Ill., a corporation of California
Filed Dec. 18, 1959, Ser. No. 860,455
2 Claims. (Cl. 180—53)

This invention relates to means for supplying hydraulic pressure to actuate the hydraulic controls of vehicles when the main engine driven pump of the vehicle ordinarily supplying such pressure is not in operation.

It is well known that with many types of hydraulic transmissions and clutches there is no positive drive connection between the engine and drive wheels or tracks of a vehicle so that when the engine is not operating it cannot be motored for starting by towing or pushing the vehicle or allowing it to coast. Furthermore, other controls depending for actuation upon hydraulic pressure are operative only when the engine is running.

Push starting of tractors is quite common, and particularly on jobs where many tractors are employed and starting engine failure might disable tractors and result in loss of use or down time for tractors that can be gainfully used when push starting is practiced.

It is an object of the present invention to provide an auxiliary pump or pressure supply means for vehicle hydraulic controls driven by the final drive train of the vehicle whereby it will be actuated upon movement of the vehicle over the ground irrespective of whether the engine of the vehicle is operating to drive the main pump. A further object is to provide means to automatically direct the flow of such an auxiliary pump to the vehicle hydraulic circuit when the main engine is not running and to divert such flow when the engine is running together with a time delay in the diverting means to insure that the operation of the engine is well established.

A still further object of the invention is to provide a reversible auxiliary pump for the purpose described together with a sensing valve to effect direction of the pump output pressure to a common discharge passage irrespective of whether the vehicle is being pushed or towed in a forward or reverse direction.

It is also an object of the invention to provide the pump and valving means hereinabove mentioned in a relatively small and compact unit capable of installation in limited space with a minimum of conduits and other connecting means.

Further and more specific objects and advantages of the invention and an understanding of its construction and operation may be gained from the following specification wherein a preferred form of the invention is described in detail by reference to the accompanying drawings.

In the drawings:

FIG. 1 is a schematic view representing in side elevation a portion of a track type tractor and showing the relationship of the device of the present invention to the final drive train thereof;

FIG. 2 is a sectional view through the operating unit of the present invention disclosing the valves thereof and illustrating the relative position of the auxiliary pump therein;

FIG. 3 is a schematic view similar to FIG. 2 but with the position of the pump changed to more clearly illustrate the intake and discharge passages thereof and their relationship with a sensing valve;

FIG. 4 is a view like FIG. 3 with parts of the valves illustrated in different operating positions; and FIG. 5 is a schematic view of a portion of the hydraulic system of the tractor of FIG. 1.

Referring to FIGS. 1 and 5, the rear portion of a track type tractor partially illustrated at 10 in FIG. 1 is representative of any one of many kinds of vehicles with which the present invention may be employed. The tractor is shown as having a hydraulically controlled transmission 12 with a control valve schematically illustrated at 11 associated therewith for directing fluid to any one of several hydraulic clutches 12a which form a part of the transmission. Fluid under pressure from a pump 51 (FIG. 5) driven by the vehicle engine 52 is directed to the control valve 11 through line 53 when the engine is operating and is communicated through a line 13 to the auxiliary pump and controls of the present invention generally indicated at 14 where it serves to control the supply of fluid from the auxiliary pump to the control valve 11 and to any other hydraulically actuated mechanism such as schematically illustrated steering clutch 54 and steering clutch brake 56 with which the tractor may be fitted, and which may communicate with control valve 11 and line 13 through line 57.

The auxiliary pump and control are disposed within the single housing of the unit 14 and are shown in FIGS. 2, 3 and 4. They comprise a control valve or diverting valve mechanism disposed in a bore 14a of the housing, a direction sensing valve generally indicated at 15 and a reversible gear pump 16. The pump 16, the position of which is shown in FIG. 1, is driven by a gear train 17 associated with the final drive gears, generally indicated at 18, of the tractor so that the pump is driven upon movement of the tractor whether or not the engine and main pump for the hydraulic controls are in operation.

The control valve in the bore 14a comprises a pair of opposed piston-like valve elements 20 and 21 slidably mounted in the bore and urged toward one end thereof, which is the right hand end as shown in the drawings, by a spring 23 of higher rate than a similar spring 24 which tends to oppose this movement.

When the tractor is in motion the pump 16 supplies hydraulic fluid under pressure to a central chamber 25 in the bore 14a between the valve elements 20 and 21 and this fluid under pressure is directed to the hydraulic system through the valve 11 if the engine of the tractor is not operating or alternately through a discharge port shown at 26 in FIG. 2 and ultimately out through a conduit 27 to a sump.

FIG. 2 shows the positions of the parts in the unit 14 which they occupy when the tractor engine is operating and the tractor is stationary with respect to the ground so that the pump 16 is not being driven. In this position, the valve elements 20 and 21 have been moved toward the left from the normal position shown in FIG. 3 to that of FIG. 2 by pressure from the main hydraulic pump entering through the line 13 and a restricted passage 29 into the bore 14a behind the valve element 21. This movements of the elements 20 and 21 toward the left opens communication between the chamber 25 and discharge orifice 26 so that, even upon movement of the tractor over the ground and consequent operation of the pump 16, the output of the latter passes freely through the unit 14 to any desired point for lubrication and eventually back to the sump from which it is drawn.

FIG. 3 illustrates the position of the parts with the tractor engine shut down and the tractor moving over the ground as during a push start operation in a forward direction. Since with the tractor engine shut down, the main pump fails to supply pressure to the bore 14a behind the valve 21, the high rate spring 23 urges both valve members 20 and 21 toward the right opening communication between the line 13 and the chamber 25 and closing communication with the outlet 26. At this point the sensing valve 15 operates to direct output from the pump 16 into the chamber 25 regardless of the direction of operation of the pump. The sensing valve 15 comprises an elongated tubular valve element 30 reciprocable in a suitable bore having connecting passageways presently to be described, and the valve element 30 is normally centered as illustrated in FIG. 2 by springs 31 of equal rate which seat against abutment 32 disposed centrally of the valve element and against stop members 33 and 34 at their opposite ends. A rod 35 disposed axially of the valve element 30 may be employed as a guide if desired.

When the tractor is moving forwardly over the ground and the gears of the pump 16 are rotating in the direction of the arrows in FIG. 3, suction is created in a passage 37, which during forward motion is the intake of the pump, and this passage communicates with the right hand end, as shown, of the valve 15 urging the valve toward the right where the suction may be maintained through notches 38 in its ends registering with passage 37. This also brings ports 39 in the tubular valve member 30 into registry with a suction passage 40 which communicates with a conduit 41 leading to a sump represented at 42 which may be any source of hydraulic fluid, such for example as the sump of the tractor transmission housing. The fluid being so withdrawn from the sump is discharged through a passage 43 now serving as the discharge passage of the pump, and is communicated through notches 38a in one end of the valve member 30, corresponding to the notches 38 in the opposite end thereof, to a branched passage 45 communicating with the chamber 25 in the bore 14a from which it passes through the line 13 to afford hydraulic pressure to the transmission and other hydraulically actuated mechanisms of the tractor.

Should the tractor be operated in the reverse direction when its engine is not running, as for starting by pushing or towing it backwards, the operation of the sensing valve 15 is reversed as shown in FIG. 4. Rearward movement of the tractor over the ground causes operation of the pump gears 16 in the opposite direction, as indicated by arrows in FIG. 4, and the passage 43 becomes the intake of the pump with the passage 37 acting as the discharge. Thus suction in the passage 43 moves the sensing valve element 30 to the left, as shown, and causes ports 39a to register with the passage 40 leading to the sump. The discharge from passage 37 now passes through notches 38 in the valve element 30 and to the branched passage 45 and chamber 25 from which it is again directed to the hydraulic system of the tractor as previously described.

With the construction described, operation of the tractor engine which normally serves to supply actuating fluid to the hydraulic system actuates the control valve in the bore 14a to block the discharge of the auxiliary pump and direct its output back to the sump. If the tractor engine is not operating, the output of the auxiliary pump is directed to the hydraulic system of the tractor (see FIG. 5) and will continue to be so directed until the tractor engine starts when the output of the auxiliary pump is again blocked by the valve element 21 because of pressure from the main pump assisted by the force of spring 24 moving the member 21 toward the left as illustrated in FIG. 2. In order to prevent this movement of the valve element 21 and closure of the line 13 too soon, as might occur if the engine fired for a short period and then died, the passage 29 is limited in size or restricted so that the movement of the valve element 21 toward the left is quite slow and will not completely block the entrance to the line 13 until the engine is operating continuously and not merely going through a false start of a few cycles' duration.

We claim:

1. In combination with an engine powered vehicle having hydraulic controls and a pump driven by the engine to supply fluid to a hydraulic system which includes said controls and having a final drive train, an auxiliary pump driven by the final drive train of the vehicle whereby it will be actuated by movement of the vehicle over the ground, a connection between said auxiliary pump and said hydraulic system for directing fluid under pressure thereto when the vehicle is in motion and its engine is not in operation, valve means in said connection operable in response to pressure in the system from the engine driven pump to by-pass fluid from the auxiliary pump whereby upon starting of the engine, as by pushing the vehicle, pressure from the engine driven pump will effect by-passing of the fluid from the auxiliary pump, and means in said connection to restrict the flow of fluid from the engine driven pump to said valve means to delay actuating the valve means until operation of the engine is well established.

2. In a vehicle which has a hydraulic control system operating on pressure from an engine driven pump and having a final drive train, an auxiliary pump driven by the final drive train of the vehicle to supply pressure to said system when the vehicle is moving over the ground but the engine is not operating, said auxiliary pump being reversible, and means between said auxiliary pump and said system operating automatically upon operation of the auxiliary pump in either direction when the engine driven pump is not operating to form a fluid connection between its intake side and a source of supply of hydraulic fluid and its discharge side and said system, said automatic means comprising passageways and a valve actuated by suction on either side of the auxiliary pump to open intake passages on that side and to open discharge passages on the output side.

References Cited in the file of this patent

UNITED STATES PATENTS

| | | |
|---|---|---|
| 2,332,593 | Nutt et al. | Oct. 26, 1943 |
| 2,734,399 | Christenson | Feb. 14, 1956 |
| 2,912,184 | Lee | Nov. 10, 1959 |